United States Patent [19]
McCarter et al.

[11] Patent Number: 5,480,743
[45] Date of Patent: Jan. 2, 1996

[54] BIPOLAR COMPRESSION CELL FOR A WATER-ACTIVATED BATTERY

[75] Inventors: Walter K. McCarter, Davie; Jorgen T. Fischer, Margate, both of Fla.

[73] Assignee: ACR Electronics, Inc., Fort Lauderdale, Fla.

[21] Appl. No.: 108,120

[22] Filed: Aug. 17, 1993

[51] Int. Cl.$^6$ .................................................. H01M 21/14
[52] U.S. Cl. ................... 429/96; 429/97; 429/99; 429/100; 429/119; 429/210; 429/220
[58] Field of Search ..................................... 429/119, 210, 429/220, 9, 96, 99, 100, 97

[56] References Cited

U.S. PATENT DOCUMENTS

| | | | |
|---|---|---|---|
| 3,884,720 | 5/1975 | Armstrong | 429/119 X |
| 3,966,497 | 6/1976 | Haner | 429/119 X |
| 4,125,680 | 11/1978 | Shropshire et al. | 429/4 |

FOREIGN PATENT DOCUMENTS 0035460  3/1980  Japan.

Primary Examiner—Prince Willis, Jr.
Assistant Examiner—M. Nuzzollilo
Attorney, Agent, or Firm—Malin, Haley, DiMaggio & Crosby

[57] ABSTRACT

A bipolar compression cell for a water-activated battery that can be used with a plurality of such cells stacked together in a side-by-side array to form the bipolar battery. Each cell includes an elastomeric frame that can be compressed and a special alloy foil that separates cuprous iodide and magnesium elements and which does not interact with the cuprous iodide or magnesium to allow for bipolar action when the cells are stacked side-by-side. The use of elastomeric frames allows for low cost manufacture, eliminating manual construction. The water-activated battery is especially useful in sonobuoys.

1 Claim, 6 Drawing Sheets

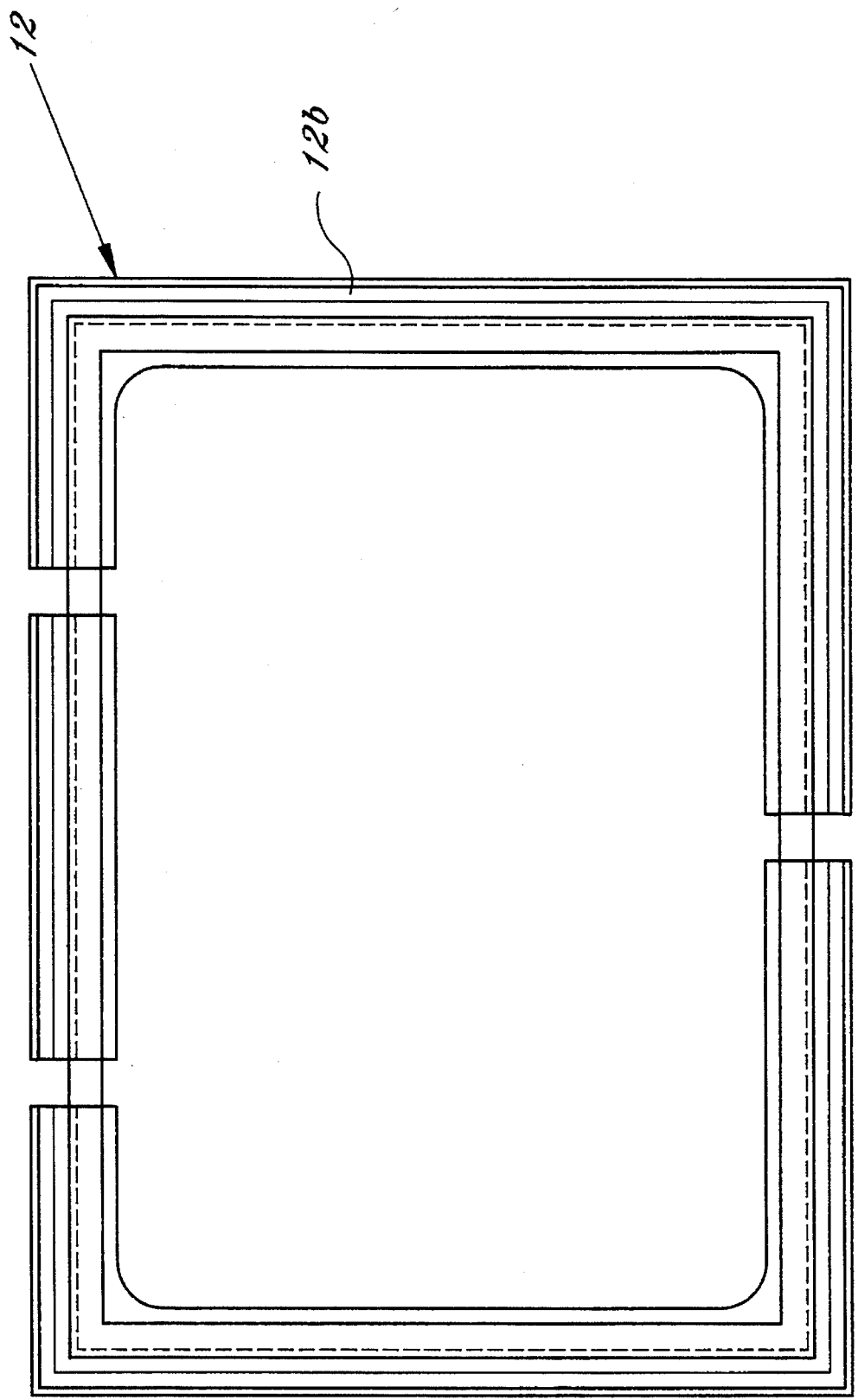

BIPOLAR COMPRESSION CELL FOR A WATER-ACTIVATED BATTERY

BACKGROUND OF THE INVENTION

1. Field of the Invention

This invention relates to a bipolar, water-activated battery, and specifically, to an improved bipolar battery that is water-activated, that is low cost in construction, allowing for robotic construction, and that includes an improved bipolar cell structure that can be replicated with a plurality of adjacent cells forming the bipolar battery, the cells being compressed together using a novel, sealable frame structure for each cell.

2. Description of the Prior Art

The use of primary reserve, water-activated batteries is well known. A water-activated battery has a long shelf life and finds service in a single application that, once activated by salt or fresh water, operates for a period of time, whereafter its usefulness is spent. When a water-activated primary reserve battery is used in a system such as a sonobuoy, which is an acoustic receiver and RF transmitter disposed into the ocean for anti-submarine warfare exercises, once activated, the battery energy is expended, and the sonobuoy's usefulness terminates. Therefore, thousands of sonobuoys a year are typically used.

Bipolar batteries are well known. With the use of a bipolar electrode, once face acts as the anode surface, and the opposite face acts as a cathode surface when an electric current is passed through a cell. Each cell need not be directly electrically connected with wires in series. With the use of a plurality of bipolar cells which are stacked adjacent each other, each cell will act in series with the other cells, forming the total voltage output of the battery, dependent on the number of cells disposed side-by-side.

It is desirous to use cuprous iodide and magnesium as the electrode elements for a water-activated battery. These electrode elements have been used in primary reserve water-activated batteries. One of the drawbacks of the primary reserve battery is the amount of manual labor required in building up a plurality of primary reserve cells and electrically connecting them together in the water-activated battery, using cuprous iodide and magnesium.

The present invention overcomes the problems of cost of construction and greatly improves the ease of manufacture by providing a bipolar battery cell frame that is elastomeric, and that acts also as a gasket for each cell. The invention utilizes a special alloy foil wall to separate each cell that is bipolar and which does not interact chemically with either the cuprous iodide or magnesium so that the individual cell structure is preserved. Using the present frame and structure, a plurality of cells are stacked together under compression due to the elastomeric frame which seals each cell from each other to prevent electrolyte transfer between cells. Through the use of the present elastomeric frame and overall construction with the special alloy foil wall that separates each cell, a bipolar compression cell is disclosed that, when stacked upon each other, forms a bipolar, water-activated battery that can be constructed at low cost.

SUMMARY OF THE INVENTION

A bipolar, water-activated battery having a plurality of individual bipolar compression cells that are stacked in a side-by-side array, the number of cells determining the total voltage output of the water-activated battery.

Each bipolar compression cell includes a cuprous iodide electrode, a magnesium electrode, an elastomeric or resilient rectangular frame having a large central opening, the frame providing surface edge indentations to firmly engage the cuprous iodide electrode on one side and the magnesium electrode on the other side, .forming a spacing between the two electrodes which allows for receipt of the electrolyte when the battery is activated by putting it in sea water or fresh water. In addition, another grooved edge is provided around the frame that receives a thin, rectangular sheet or foil made of a special alloy that does not react with either cuprous iodide or magnesium or the electrolyte, the super alloy being called C22, made by Hastoloy. The foil intercell acts to separate the cuprous iodide cathode from the magnesium anode between cells, while allowing electrons to flow therethrough in the bipolar action of the battery cells. The frame also includes a gasket portion that is a wedge-shaped protrusion on one side and includes a wedge-shaped groove on the other side, aligned to fit between frames in a sealed manner, sealing one frame from the other, especially when compression is applied to each end of the total cell network or array. Each cell frame also includes a plurality of openings along the top and bottom, which allow for the water to be received into each cell along a passageway formed by the openings in each frame when they are aligned in contact with each other, and also to allow for venting of gases as the battery operates. Therefore, water and gas passages are formed when the plurality of frames are stacked or aligned together, forming the bipolar battery. Each cell is constructed element by element and placed together in a serial alignment, all of which can be done robotically, eliminating human or manual labor in the construction of the battery. A special two part battery housing is used that includes fastening elements that have interlocking teeth, and allows for the two parts of a housing to be pushed together while holding the plurality of individual bipolar cells mounted therein in compression so that there is compression on the cell frames, forcing the frame gasket portions to interlock tightly, sealing each cell in terms of the battery, while the exterior housing parts are locked together. This battery housing fits within the sonobuoy and acts as the power source. The battery has wires attached into the sonobuoy circuitry as necessary.

Thus, each individual bipolar cell includes a foil intercell barrier made of C22 special alloy that allows electrons to pass therethrough, which is engaged at its perimeter to the elastomeric frame. Each frame has a groove for mounting a cuprous iodide cathode, a spacing element allowing spacing between the cuprous iodide cathode and a magnesium anode, which is also mounted to the frame. The bipolar cells can then be stacked against each other in a side-by-side array. The number of cells will ultimately determine the voltage of the overall battery.

In operation, once the cells have been stacked together and placed (compressed together) in the housing, water will be received into the housing and into the passageways formed in the frame, allowing the water to be received in the space between the cuprous iodide and magnesium electrodes, starting the action of the battery to produce electricity. Gas will vent through the venting passages provided. Once activated, the entire bipolar battery will then produce electricity until it is expended.

Through the use of the unique frame, which is elastomeric and acts both as a gasket to seal each cell from each other, and a bipolar battery construction, using the special alloy that does not react with the cuprous iodide or magnesium, great economy is achieved in the overall construction of the battery.

It is an object of this invention to provide a bipolar compression cell for use in a water-activated battery.

It is another object of this invention to provide an improved bipolar cell for use in a bipolar battery that is water-activated, that utilizes cuprous iodide and magnesium as electrodes.

And yet still another object of this invention is to provide a low cost, bipolar battery that is water-activated.

And yet still another object of this invention is to produce a low cost, water-activated battery, utilizing cuprous iodide and magnesium, that can be assembled robotically, eliminating man hours of labor in its construction, reducing the cost.

But yet still another object of this invention is to provide an improved water-activated battery that is useful and economical for sonobuoys or the like that is low cost, without affecting the performance.

In accordance with these and other objects which will become apparent hereinafter, the instant invention will now be described with particular reference to the accompanying drawings.

BRIEF DESCRIPTION OF THE DRAWINGS

FIG. 7 shows a back plan view in elevation of a frame in accordance with the present invention.

DESCRIPTION OF THE PREFERRED EMBODIMENTS

Figure 1:
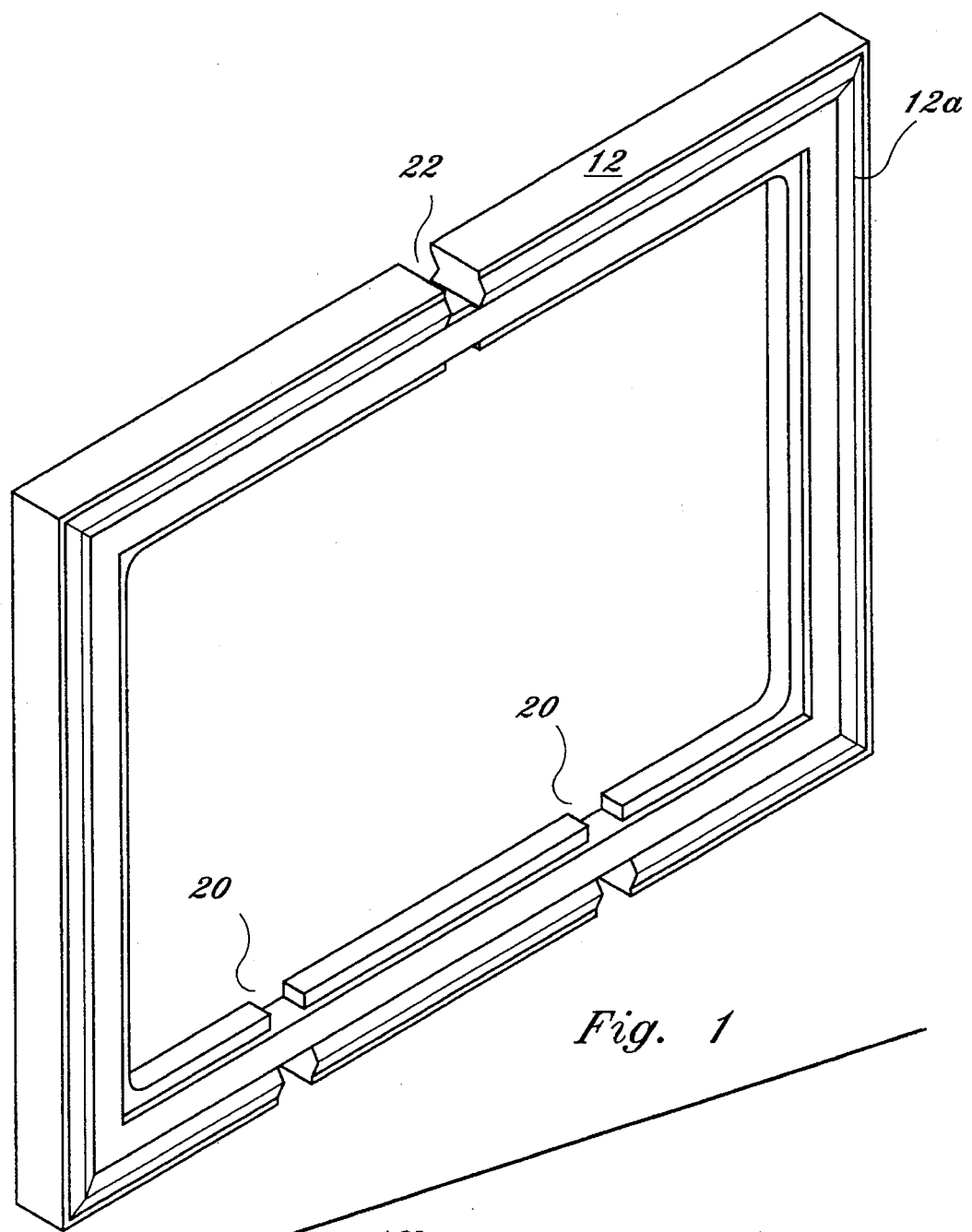
FIG. 1 shows a perspective view of a frame, useful for forming each cell in accordance with the present invention.

Referring now to the drawings, and in particular, to FIG. 1, an elastomeric frame 12 is shown that can be made of plastic or PVC that has resiliency. The frame 12 acts as the individual cell housing for one bipolar cell used in the invention. The frame 12 also includes on one side a wedge-shaped protrusion that traverses around the frame, and on the opposite side, a wedge-shaped groove which traverses around the frame's opposite side. The wedge-shaped protrusion 12a is spaced and arranged so that when pressed against another identical frame on the wedge-shaped groove side, there is a gasket fit that allows for sealing between frame members. This is an elastomeric seal to prevent electrolytic leakage between cells. FIG. 1 also shows a plurality of spaces 20 on the inside and outside portions of the bottom part of the frame and spaces 22 at the top. The purpose of these spaces is to align with adjacent frames to form a passageway completely through the battery to allow water to be received into each cell and gas to vent from all cells once the battery is activated.

Figure 2:
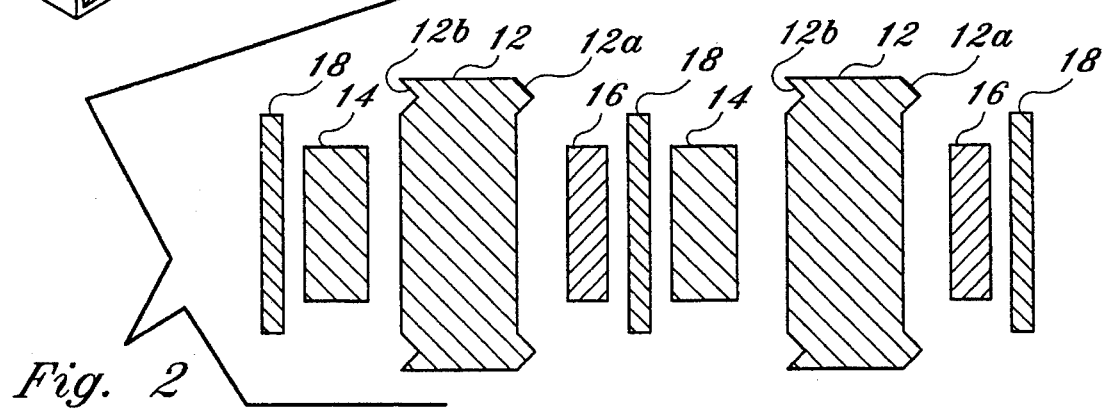
FIG. 2 shows a schematic diagram of a side view of two cells in an exploded view.

To form the specific array of cells useful to create the low cost battery in accordance with the present invention, FIG. 2 shows a schematic diagram. Looking at FIG. 2, two frames 12 are surrounded on each side by various components. Element 18 represents a foil wall that is made of the special alloy C22, that engages a channel on the frame. The C22 foil 18 contacts a cuprous iodide electrode, which is a plate of cuprous iodide 14, which has its own independent mounting ledge around the frame member surface on one side. The frame also acts as a spacing element so that when the magnesium electrode 16 is pressed against the opposite side of each frame 12, there is a space between the magnesium electrode 16 and the cuprous iodide electrode 14. Again, between the magnesium electrode 16 and an adjacent cuprous iodide electrode 14, is placed the foil wall 18. The arrangement of cell elements is repeated as each cell is stacked on each other. Note that each frame 12 includes a wedge projection 12a on one side and a wedge groove 12b on the opposite side, so that when the frames (and cells) are compressed together, because they are elastic and resilient, a gasket seal is formed around each frame member in this side-by-side array, preventing electrolyte from flowing from one cell to another. The electrolyte does flow into the space created between each electrode 14 and electrode 16 through the channels provided, such as channel 22 shown in FIG. 1 when the cells are stacked together. Note that using this array, the frame and cell elements can be constructed together and stacked together robotically, eliminating wiring and soldering and other connectors that would have to be manually done as in a regular, primary reserve battery. When looking at the battery formed by the battery cell elements shown in FIG. 2, the special alloy C22, creating the foil 18, allows electrons to pass through in conventional bipolar operation. The material C22, however, does not react chemically with the cuprous iodide cathode 14 or the magnesium anode 16.

Figure 3:
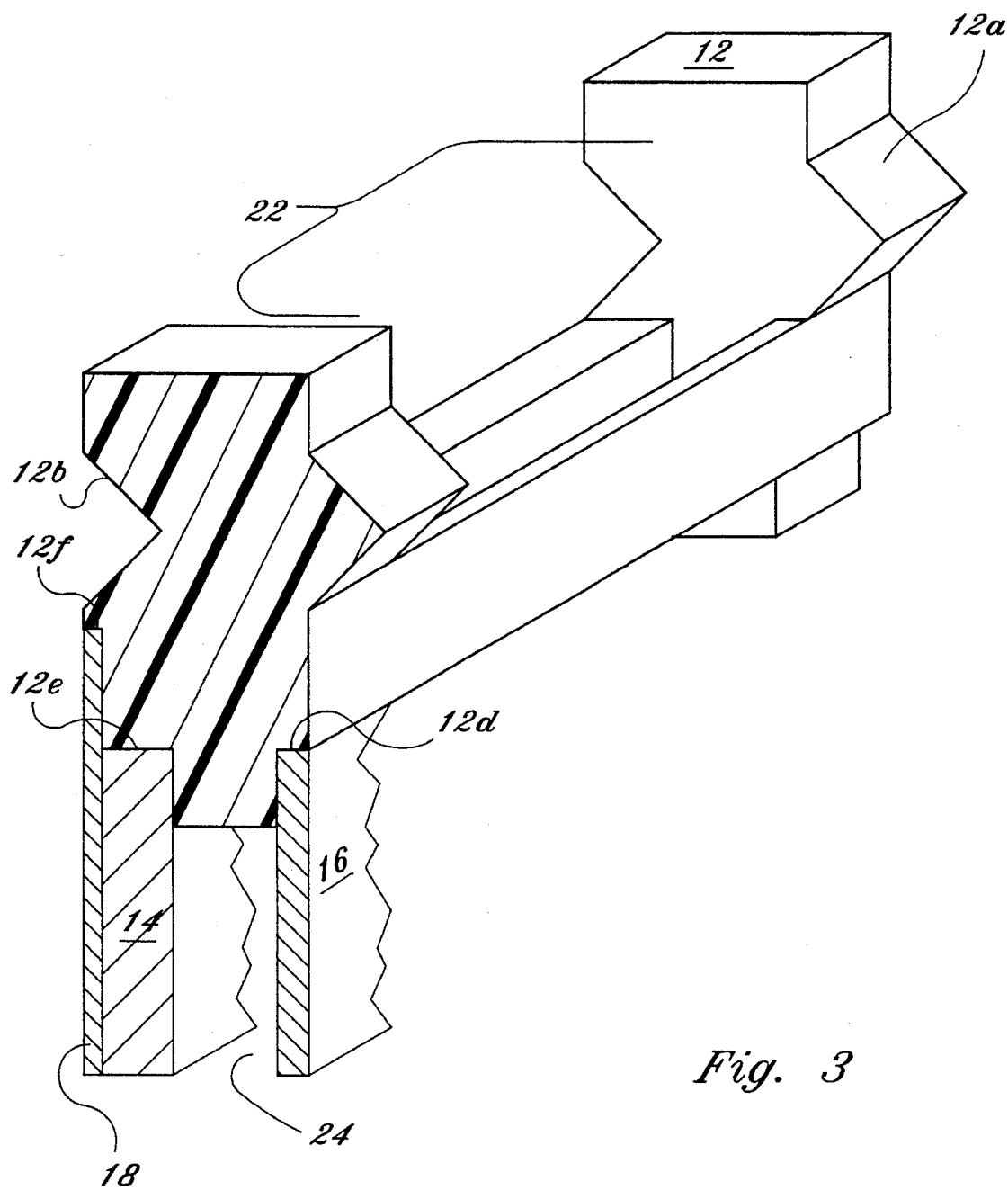
FIG. 3 shows a partially cut away perspective view of a frame portion and cell portion.

Referring now to FIG. 3, each frame 12 includes a wedge projection 12a that acts as a gasket when interlocking with an adjacent wedge-shaped groove 12b. In addition, the inside of the frame and certain portions of the frame surface include ledges such as 12d that allows magnesium electrode 16 to be firmly mounted to the frame, and a spacing element 24 between the electrodes formed by the frame housing, and a frame indentation 12e that receives the cuprous iodide and allows it to be mounted to the frame 12. In addition, the foil intercell barrier 18 has its own frame ledge 12f that holds it in place. The frame also is shown in FIG. 3 having a passage 22 that allows for water flow-through.

Figure 4:
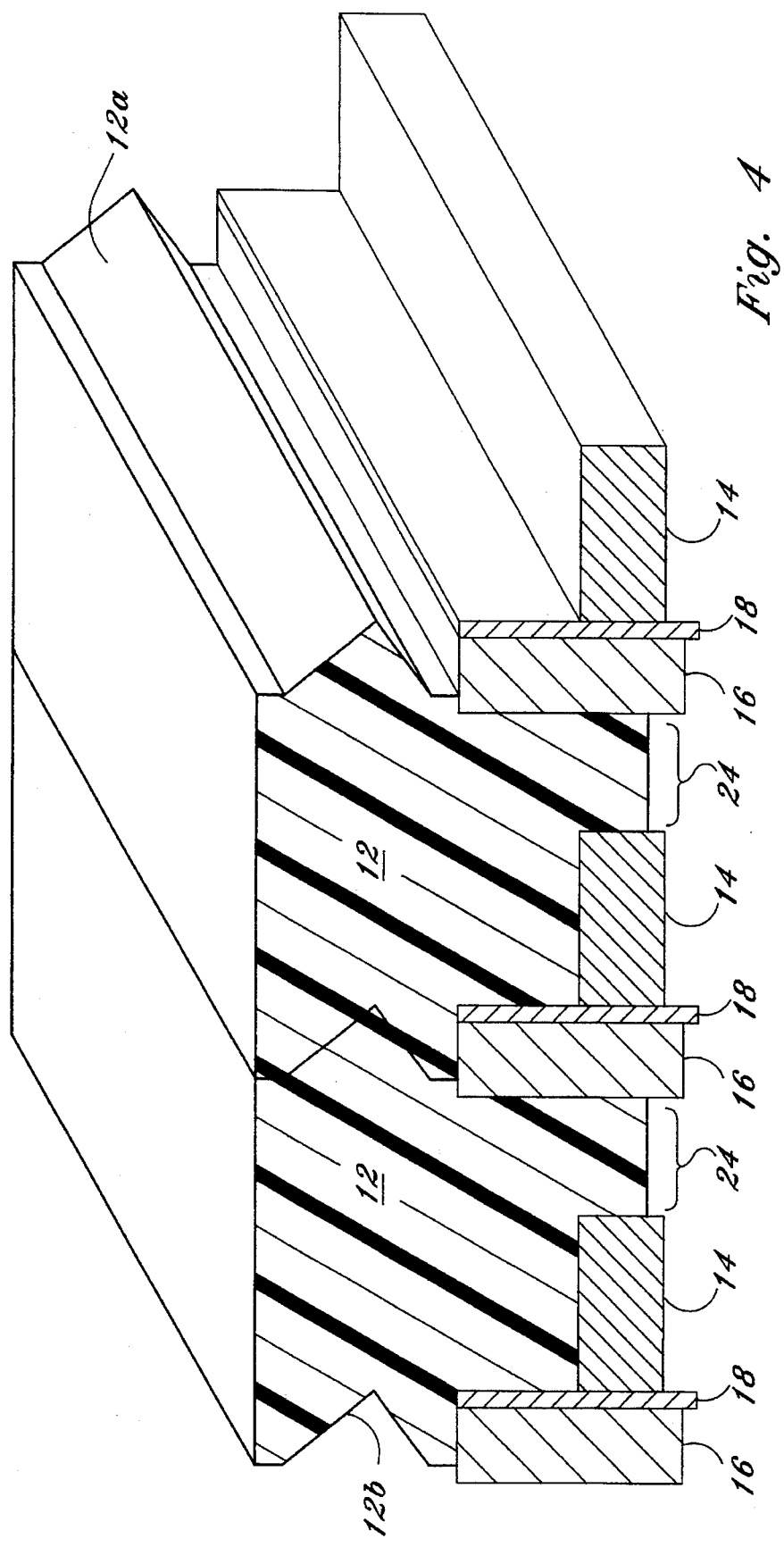
FIG. 4 shows a perspective, partially cut away view of a portion of the frame and battery cell members.

FIG. 4 also shows the same pairs of frames mounted together to form essentially a two-cell, bipolar battery arrangement. In reality, a plurality of frames (cells) would be mounted side-by-side serially to achieve the total amount of voltage required for a particular unit. Note that the frame members 12 are elastic and can be compressed together along the longitudinal axis of the entire battery, forming the gaskets to be compressed to form better seals.

Figure 5:
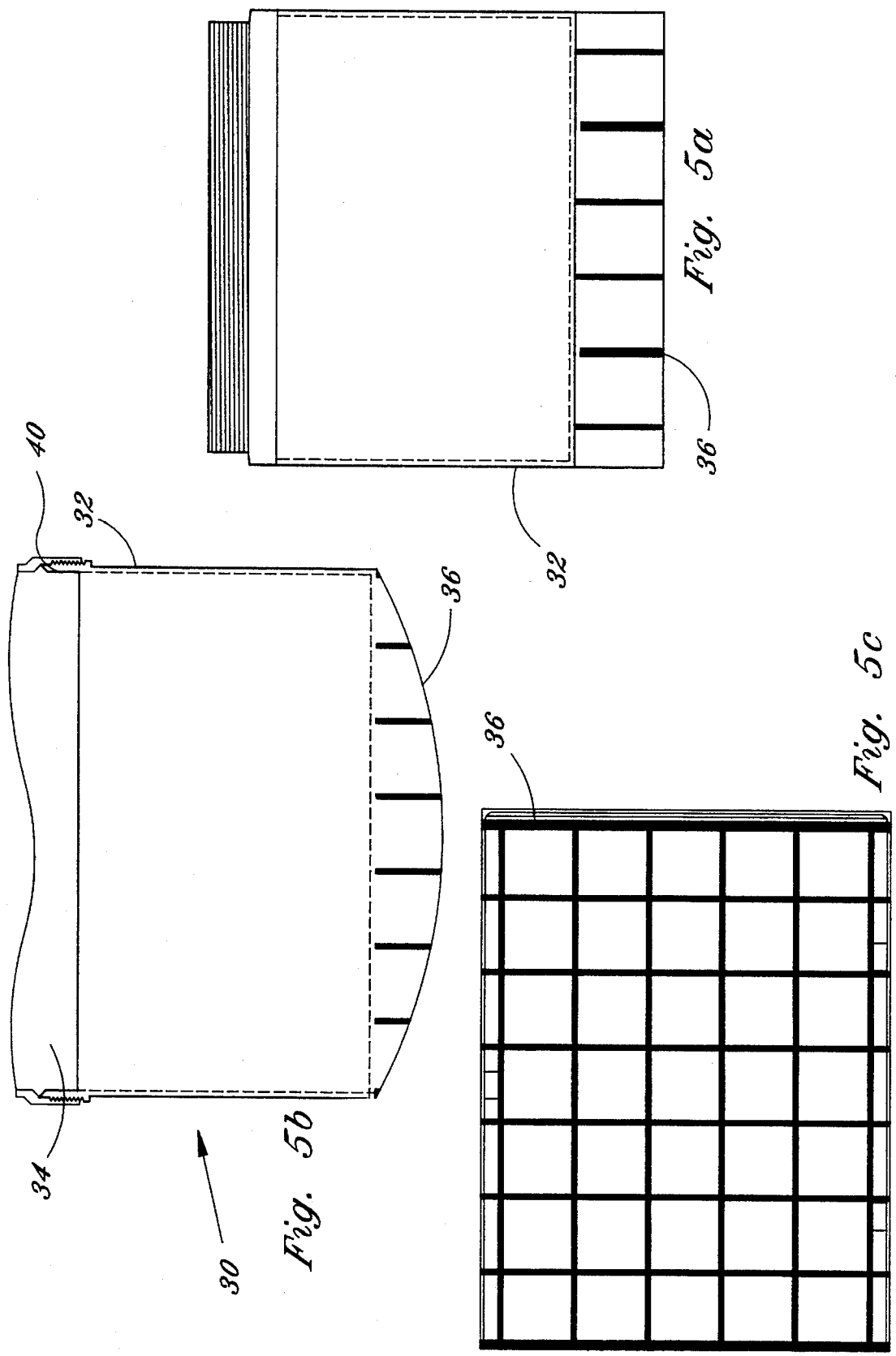
FIG. 5A shows a top plan view of half of a housing used with the cells described in the invention to form the battery.
FIG. 5B shows the battery cell housing, partially cut away in a top plan view.
FIG. 5C shows an end view in elevation of the housing shown in FIGS. 5A and 5B.

FIGS. 5A, 5B, and 5C show a rectangular housing (rectangular in cross section) that has a special fastener 40, comprised of a plurality of serrated teeth facing in one direction so that the overall housing includes a first segment rectangular member 32 that interlocks with a second similarly sized sealed housing 34 that is rectangular, with the cells being compressed inside as the two units are locked together. Therefore, a rectangular, box-like housing is formed between segment 32 and segment 34, with a plurality of frames and cells being disposed therein and compressed together so that the fastener 40, once engaged, will hold all of the frames in compression in the cell. The housing has a special configuration 36 that is curved, and that allows it to be placed in a sonobuoy for a tight fit in the sonobuoy housing.

Figure 6:
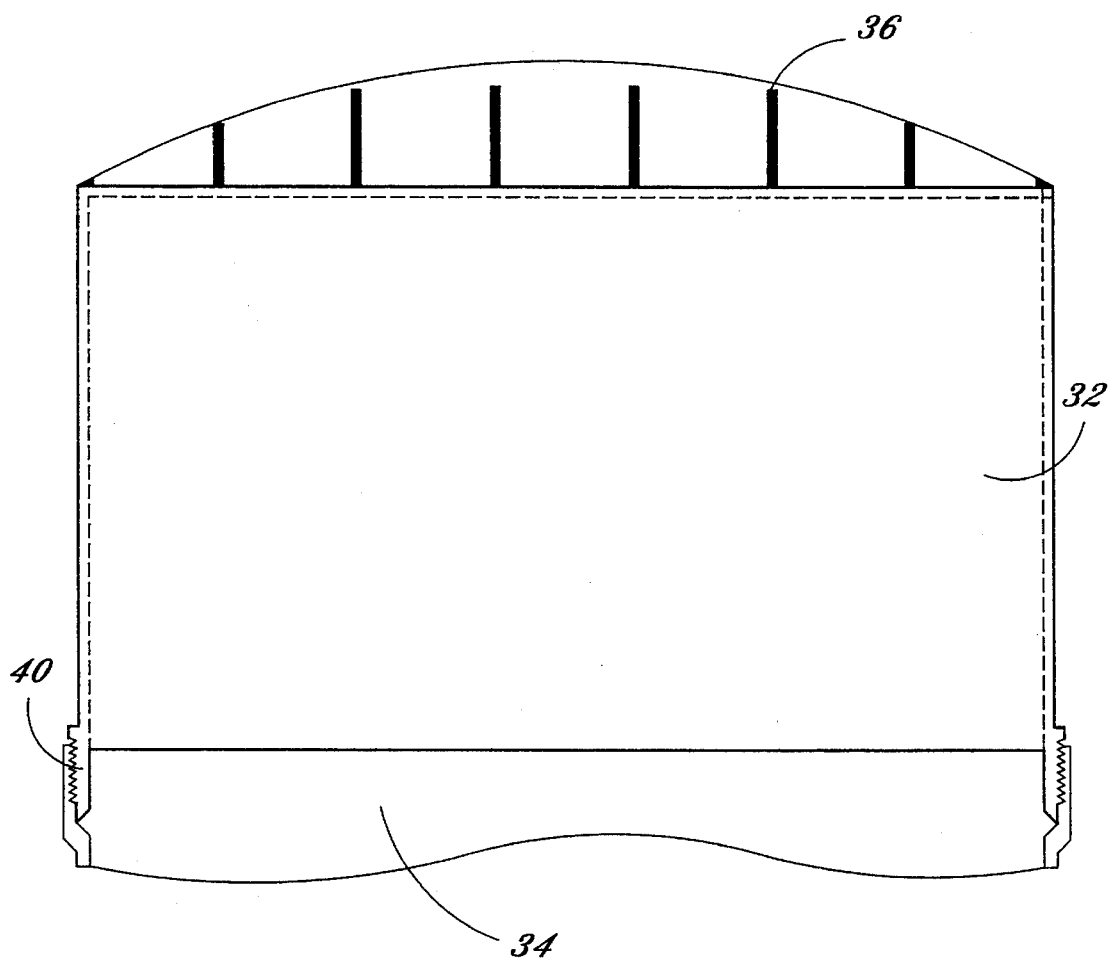
FIG. 6 shows a top plan view, partially cut away of the housing used in the present invention.

FIG. 6 shows the housing with the two segments 34 and 32 joined together with fastener 40 firmly holding the frames inside in compression. The wiring from the inside of the bipolar battery through the housing is not shown, but once the frames are installed, there are holes placed in the housing, either in 32 or 34, that allow water to be received into the housing to activate the battery. The battery itself, although bipolar, will include connectors into the sonobuoy circuitry for operation.

FIG. 7 shows the back side of a frame with various measurements, with the ledges and wedge-shaped groove 12b as discussed before.

When looking at the overall operation of the battery, the purpose of the invention is to provide an improved housing for a bipolar battery of reduced cost. This allows for numerous water-activated, bipolar batteries to be used at low cost to the military for sonobuoys, which are expended in large numbers in submarine operations. It also allows the use of cuprous iodide and magnesium as the electrodes in the bipolar battery. The use of the elastomeric frame under compression provides a seal and a housing for the battery elements for both physical and electrical protection with intercell connections to form bipolar batteries. Each cell would be approximately 1.4 volts and can be manufactured and stacked together robotically since no alignment has to be performed because of the overall nature of the frame structure and the battery elements provided.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. A bipolar, water-activated battery having a plurality of bipolar compression cells that are stacked in a side-by-side array, said cells separated by sealable frames, the number of cells determining the total voltage output of the water-activated battery, said battery comprising:

a plurality of bipolar compression cells, each cell including an elastomeric frame; a cuprous iodide electrode; and a magnesium electrode, said elastomeric frame having a central opening, said elastomeric frame having a first surface edge indentation to engage said cuprous iodide electrode on one side of said frame and a second frame surface edge indentation on an opposite side for engaging said magnesium electrode on the opposite side of the frame, said frame forming a spaced enclosure for receiving electrolyte between said iodide electrode on one side and said magnesium electrode on the opposite side;

said frame spacing allowing for receipt of an electrolyte when the battery is activated; said frame including a third surface edge indentation around the frame perimeter;

a foil barrier having a peripheral edge, said third surface edge indentation for receiving the peripheral edge of said foil barrier, said foil barrier being made of a material that does not react with either cuprous iodide or magnesium or the electrolyte of the battery; said foil barrier being mounted in contact with said third surface edge indentation of said frame;

said foil barrier separating the cuprous iodide electrode from the magnesium electrode between compression cells; said elastomeric frame including a gasket portion having a wedge-shaped protrusion on one side of said frame and a wedge-shaped groove on the other side of said frame, said wedge-shaped protrusion on one frame being sized to fit into said wedge-shaped groove on an identical frame and aligned to interlock said frames together in a sealed liquid impervious relationship; said battery including a plurality of cells including at least two or more frames compressed together and fit together in said wedge-shaped groove and said wedge-shaped protrusions side to side to form a total cell array;

each cell frame including a top part and a bottom part and a plurality of openings along the top and bottom parts which allow for the electrolyte to be received into each cell, said frame openings being aligned with adjacent frames to form a passageway to allow for venting of gases during battery operation;

a battery housing having a first part and a second part, said housing including fastening means and having interlocking teeth to allow the first housing part to be locked to the second housing part within which said individual frames are mounted together forming a plurality of bipolar cells, said cells being mounted in compression so that there is compression on the cell frames forcing the frame gaskets to interlock tightly when the housing first and second parts are locked together.

\* \* \* \* \*